United States Patent
Nishiyabu et al.

(10) Patent No.: US 12,202,567 B2
(45) Date of Patent: Jan. 21, 2025

(54) VEHICLE

(71) Applicant: KAWASAKI MOTORS, LTD., Akashi (JP)

(72) Inventors: Masaki Nishiyabu, Akashi (JP); Takuya Noami, Akashi (JP); Tetsuji Yamamoto, Akashi (JP); Yuji Hida, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 110 days.

(21) Appl. No.: 17/646,452

(22) Filed: Dec. 29, 2021

(65) Prior Publication Data

US 2022/0250708 A1 Aug. 11, 2022

(30) Foreign Application Priority Data

Feb. 9, 2021 (JP) ................. 2021-018924

(51) Int. Cl.
| | |
|---|---|
| *F16H 63/32* | (2006.01) |
| *B62K 11/04* | (2006.01) |
| *F16H 59/70* | (2006.01) |
| *F16H 63/30* | (2006.01) |
| *F16H 57/00* | (2012.01) |

(52) U.S. Cl.
CPC ............. *B62K 11/04* (2013.01); *F16H 59/70* (2013.01); *F16H 63/30* (2013.01); *F16H 2057/0056* (2013.01)

(58) Field of Classification Search
CPC ................. B62K 11/04; F16H 61/32
See application file for complete search history.

(56) References Cited

U.S. PATENT DOCUMENTS

| | | | |
|---|---|---|---|
| 6,085,607 A | 7/2000 | Narita et al. | |
| 9,550,417 B2 * | 1/2017 | Fujimoto | ................ F16H 63/18 |
| 2007/0251747 A1 | 11/2007 | Kosugi | |
| 2008/0127766 A1 | 6/2008 | Ogasawara | |
| 2009/0165583 A1 * | 7/2009 | Ogasawara | ............. F16H 63/18 74/335 |
| 2009/0266192 A1 | 10/2009 | Shiozaki et al. | |
| 2015/0274011 A1 | 10/2015 | Fujimoto et al. | |

(Continued)

FOREIGN PATENT DOCUMENTS

| | | |
|---|---|---|
| DE | 102015204334 A1 | 10/2015 |
| EP | 1857716 A2 | 11/2007 |

(Continued)

*Primary Examiner* — Randell J Krug
(74) *Attorney, Agent, or Firm* — Alleman Hall & Tuttle LLP

(57) ABSTRACT

A vehicle includes: a power unit including a transmission that changes the speed of rotation produced by output power of a drive source for travel and a case accommodating the transmission, the transmission including a pivotally supported change shaft, the change shaft being angularly movable about an axis to change a gear ratio of the transmission; and an operation unit that operates to angularly move the change shaft, the operation unit including an electric motor and a power transmission structure that transmits power of the electric motor to the change shaft in the form of rotational power by which the change shaft is angularly moved. The operation unit is mounted on an exterior of the case.

14 Claims, 5 Drawing Sheets

(56) References Cited

U.S. PATENT DOCUMENTS

| | | |
|---|---|---|
| 2019/0207474 A1 | 7/2019 | Uematsu et al. |
| 2019/0309827 A1 | 10/2019 | Kittaka |
| 2021/0001707 A1 | 1/2021 | Nishiyabu et al. |

FOREIGN PATENT DOCUMENTS

| | | | |
|---|---|---|---|
| EP | 3763973 A1 | | 1/2021 |
| JP | H0539865 A | | 2/1993 |
| JP | 2007309511 A | | 11/2007 |
| JP | 2015077887 A | * | 4/2015 |
| JP | 2015194126 A | * | 11/2015 |
| JP | 2021008215 A | | 1/2021 |

* cited by examiner

VEHICLE

CROSS-REFERENCE TO RELATED APPLICATION

This application claims priority to and the benefit of Japanese Patent Application No. 2021-18924 filed on Feb. 9, 2021, the entire disclosure of which is incorporated herein by reference.

BACKGROUND OF THE INVENTION

Field of the Invention

The present disclosure relates to a vehicle equipped with an electronic gear-shifting system electrically operated to angularly move a change shaft of a transmission that changes the speed of rotation produced by output power of a drive source for travel.

Description of the Related Art

Japanese Laid-Open Patent Application Publication No. 2007-309511 discloses a vehicle equipped with an electronic gear-shifting system. This system uses a shift rod to convert power of an electric motor into linear motion power. The power of the electric motor is transmitted through the shift rod to a change shaft of a transmission that changes the speed of rotation produced by output power of a drive source for travel, and the change shaft is angularly moved by the transmitted power.

In the above vehicle, a power transmission structure that transmits the power of the electric motor to the change shaft needs to be properly disposed in the vehicle body. The shift rod must be located in the power transmission structure, and the vehicle needs to be designed to have a sufficient space for inclusion of the power transmission structure.

SUMMARY OF THE INVENTION

A vehicle according to one aspect of the present disclosure includes: a power unit including a transmission that changes the speed of rotation produced by output power of a drive source for travel and a case accommodating the transmission, the transmission including a pivotally supported change shaft, the change shaft being angularly movable about an axis to change a gear ratio of the transmission; and an operation unit that operates to angularly move the change shaft, the operation unit including an electric motor and a power transmission structure that transmits power of the electric motor to the change shaft in the form of rotational power by which the change shaft is angularly moved, wherein the operation unit is mounted on an exterior of the case.

DETAILED DESCRIPTION OF THE EMBODIMENTS

Figure 1:
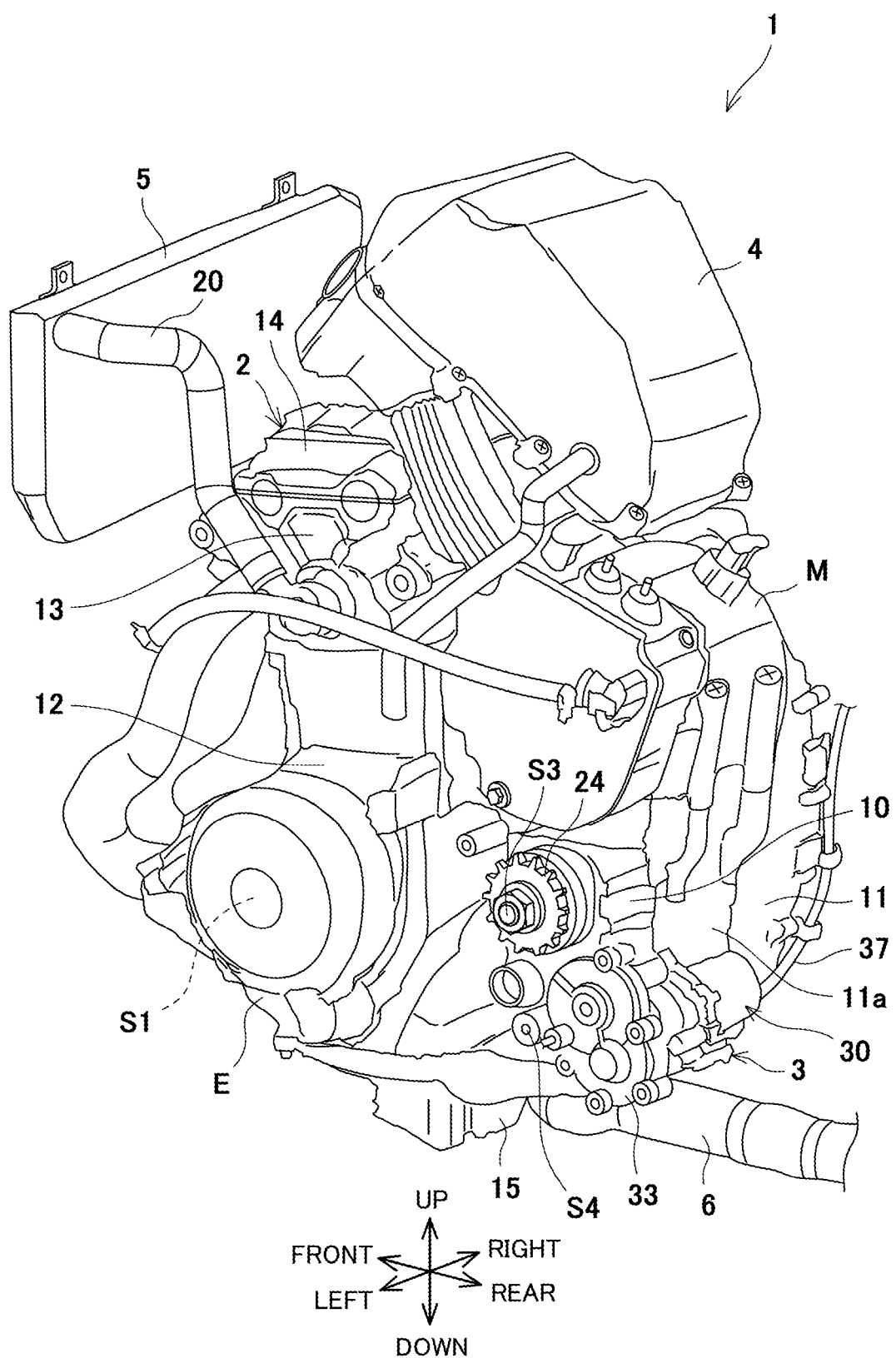
FIG. 1 is a perspective view illustrating key parts of a vehicle according to an exemplary embodiment.
Figure 2:
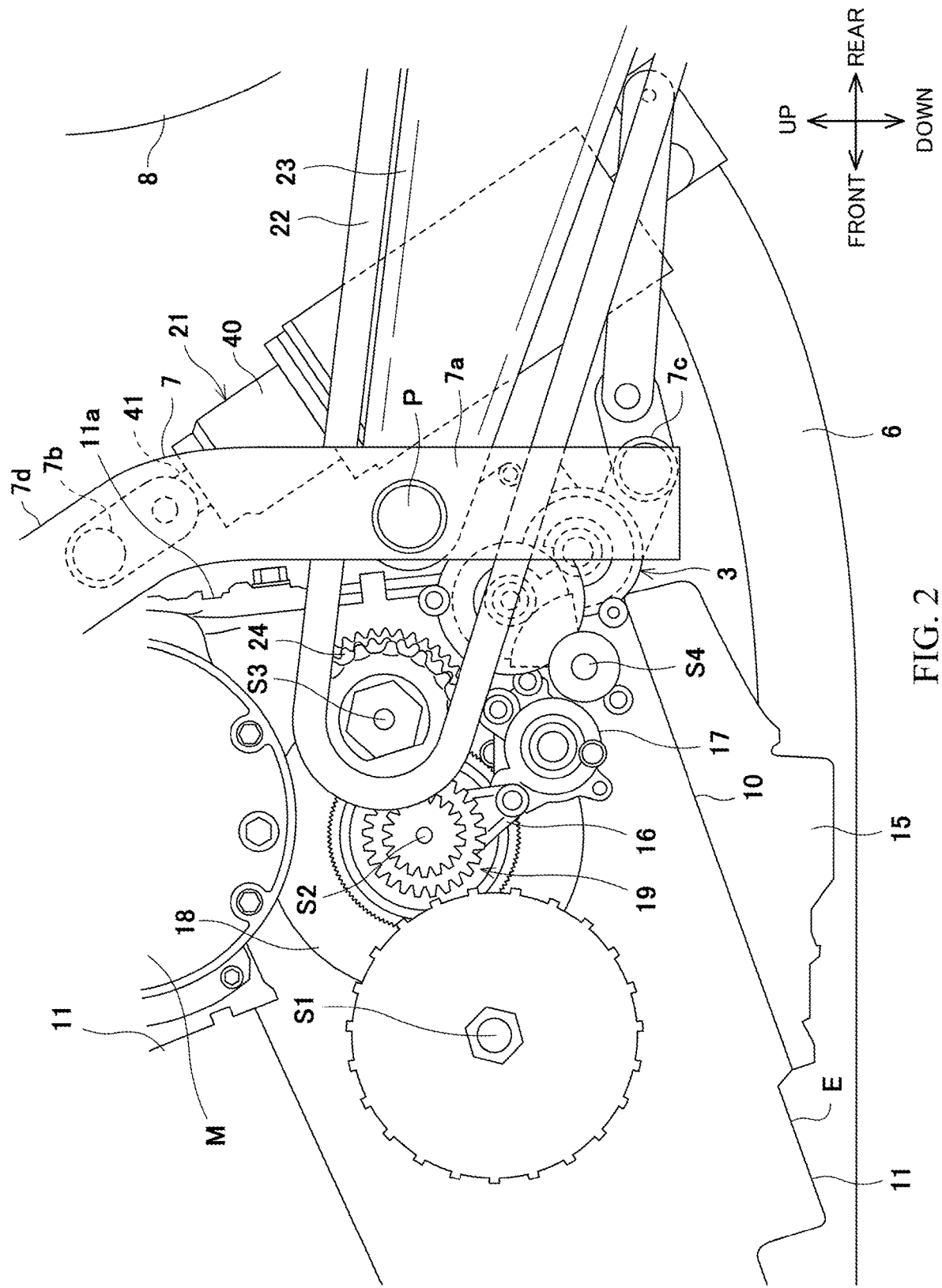
FIG. 2 is a partial view illustrating the internal structures of a power unit and an operation unit of FIG. 1 as viewed from outside in the vehicle width direction.

Hereinafter, exemplary embodiments will be described with reference to the drawings. The directions mentioned in the following description are those defined based on the viewpoint of the user of a vehicle 1. The drive sources mentioned in the following description are drive sources for travel, unless otherwise stated. FIG. 1 is a perspective view illustrating key parts of a vehicle 1 according to an exemplary embodiment. FIG. 2 is a partial view illustrating the internal structures of a power unit 2 and an operation unit 3 of FIG. 1 as viewed from outside in the vehicle width direction. The vehicle 1 is, for example, a hybrid vehicle including two or more drive sources for travel. The drive sources include an engine (internal combustion engine) E and a motor for travel M. The vehicle 1 is, for example, a straddle vehicle on which the user is seated in a straddling position, and may be a motorcycle. The vehicle 1 is configured to allow the user to choose which of the drive sources is used for travel. Specifically, the vehicle 1 is switchable between a mode where only the motor for travel M is used as the drive source for travel and a mode where at least the engine E is used as the drive source for travel.

Referring to FIGS. 1 and 2, the vehicle 1 includes a power unit 2, an operation unit 3 connected to the power unit 2, and a vehicle body frame 7 extending in the front-rear direction of the vehicle body. The vehicle body frame 7 includes a pair of main frame portions 7d opposed to each other in the vehicle width direction and extending rearward from a head pipe. The power unit 2 includes the drive sources for travel, a transmission 10 that changes the speed of rotation produced by output power of the drive sources for travel, and a unit case 11 accommodating the transmission 10. The power unit 2 of this embodiment is coupled to several portions of the vehicle body frame 7 including the pair of main frame portions 7d by means of fasteners and is thus supported by the vehicle body frame 7. The lateral regions of the power unit 2 are protected in part by the vehicle body frame 7. The power unit 2 is located ahead of the drive wheel (rear wheel) 8 of the vehicle 1. The power unit 2 is located behind the front wheel of the vehicle 1.

The engine E includes a crankcase 12, at least one cylinder block 13, a cylinder head cover 14, and an oil pan 15. The crankcase 12 is located in a lower region of the vehicle body, and accommodates and rotatably supports a crankshaft S1. The cylinder block 13 is located above the crankcase 12. The cylinder block 13 contains at least one cylinder therein. The cylinder head cover 14 is located above the cylinder block 13. The oil pan 15 is located below the crankcase 12.

An air cleaner 4 that purifies air to be taken into the engine E is located above the engine E. A radiator 5 is located ahead of the engine E. The radiator 5 cools a refrigerant delivered from the engine E through a flow pipe 20 that allows the refrigerant to circulate between the radiator 5 and the engine E. To a front portion of the engine E is connected an exhaust pipe 6 through which exhaust gas from the engine E flows. The exhaust pipe 6 extends rearward from the front portion of the engine E, passes beneath the engine E, and leads to a point behind the power unit 2. The exhaust pipe 6 is connected to a muffler located behind the operation unit 3. The motor for travel M is located in a rear region of the power unit 2. The motor for travel M is located behind the cylinder block 13 and above the transmission 10.

The transmission 10 is located behind the crankcase 12. The transmission 10 includes an input shaft S2 that receives power transmitted from the crankshaft S1, an output shaft S3 that outputs power of the transmission 10 to the outside of the transmission 10, and a gear train 19 located on a power transmission route between the input and output shafts S2 and S3 to change the speed of rotation produced by power transmitted from the input shaft S2 to the output shaft S3. The transmission 10 of this embodiment is a dog clutch transmission.

The transmission 10 includes: at least one shift fork 16 operable to select the gear of the gear train 19 that is to participate in power transmission and move the gear to change the gear ratio; a shift drum (change drum) 17 having a guide groove on its outer circumferential surface and operable to move the shift fork 16 along the guide groove; and a change shaft S4 operable to angularly move the shift drum 17 relative to the shift fork 16 in increments of a predetermined angle to move the portion of the guide groove that is in contact with the shift fork 16. The shift fork 16 extends toward both input and output gears of the gear train 19. The shift drum 17 is located between the input and output shafts S2 and S3 in the front-rear direction to engage both the input and output gears with the shift fork 16. The shafts S1 to S4, which are constituting elements of the vehicle, extend in the vehicle width direction. In other words, the shafts S1 to S4 extend parallel to one another.

The input shaft S2 is located ahead of the change shaft S4. The output shaft S3 is also located ahead of the change shaft S4. The output shaft S3 is located behind and above the input shaft S2. The shafts S2 and S3 are spaced from the change shaft S4 in the up-down direction. For example, the change shaft S4 as viewed in its axial direction is located in a region lying below a straight line passing through the axial centers of the input and output shafts S2 and S3. The change shaft S4 is included in the transmission 10 and pivotally supported to be angularly movable about an axis. The transmission 10 changes the gear ratio by the angular movement of the change shaft S4. The transmission 10 further includes a clutch 18 that establishes or cuts off power transmission between the drive source for travel and the drive wheel 8. The clutch 18 in this embodiment is mounted on a first axial half (e.g., the right half) of the input shaft S2 coaxially with the input shaft S2.

The unit case 11 extends in the front-rear direction of the vehicle body. The unit case 11 of this embodiment is integral with the crankcase 12. The unit case 11 is continuous with the crankcase 12 in the front-rear direction. The motor for travel M is located above the unit case 11.

The operation unit 3 includes an electric motor 30 and a power transmission structure 31. The electric motor 30 includes a drive shaft S5 rotationally driven and outputs power in the form of rotational power. The electric motor 30 is cylindrical in shape. The electric motor 30 of this embodiment overlaps the shift drum 17 when viewed in a direction perpendicular to the axis of the shift drum 17. The operation unit 3 operates (e.g., a shift operation) to angularly move the change shaft S4 by the power of the electric motor 30. The operation unit 3 is mounted on the exterior of the unit case 11. The operation unit 3 of this embodiment is fastened to one of the peripheral walls of the unit case 11 by means of fasteners. The points at which the operation unit 3 is fastened to the unit case 11 are located outside the center of the transmission 10 in the vehicle width direction. In a specific example, the operation unit 3 is supported by a region of the rear peripheral wall of the unit case 11, the region being on the same side as a second axial half (the left half) of the input shaft S2 in the axial direction of the input shaft S2.

The operation unit 3 is aligned with the crankcase 12 in the front-rear direction. The operation unit 3 is located across the input shaft S2 from the crankcase 12 in the front-rear direction. In this embodiment, the rear end of the unit case 11 is located above the output shaft S3. The front end of the operation unit 3 is located ahead of the rear end of the unit case 11. For example, the unit case 11 includes a recess located in the rear lower portion of the unit case 11 and recessed forward relative to the rear upper portion of the unit case 11. The operation unit 3 is disposed in such a manner that the circumferential surface of the electric motor 30 faces the inner surface of the recess. The operation unit 3 is located behind the change shaft S4. The lower end of the operation unit 3 is located below the rear lower end of the unit case 11. The points at which the operation unit 3 is fastened to the unit case 11 are located above the upper end of the oil pan 15.

Figure 3:
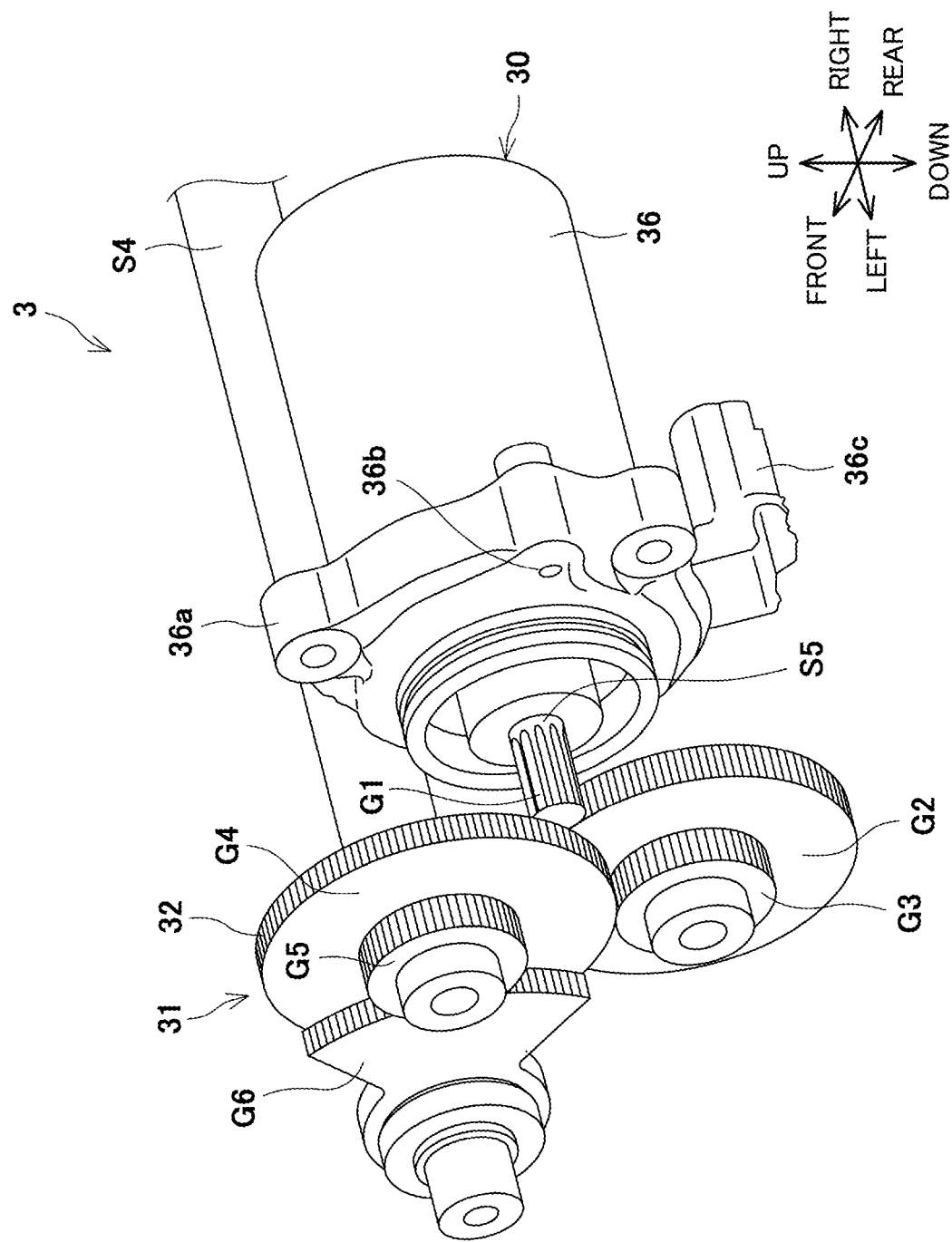
FIG. 3 illustrates the internal structure of the operation unit of FIG. 1 as viewed from outside in the vehicle width direction.

The electric motor 30 overlaps the rear wall 11a of the unit case 11 when viewed in the front-rear direction. The electric motor 30 is located inside the pair of main frame portions 7d of the vehicle body frame 7 in the vehicle width direction. The electric motor 30 is located close to the change shaft S4, with one of the peripheral walls of the unit case 11, in particular the rear wall 11a, interposed between the electric motor 30 and the change shaft S4. Referring to FIG. 3, the drive shaft S5 of the electric motor 30 is closer to the change shaft S4 than at least one of the input and output shafts S2 and S3. In other words, the distance between the axes of the drive shaft S5 and change shaft S4 is smaller than the distance between the axis of the drive shaft S5 and the axis of at least one of the input and output shafts S2 and S3.

In the vehicle 1, one axial end of the change shaft S4 projects axially outward beyond the lateral surface of the unit case 11 that is on the same side as the second axial half of the input shaft S2. The operation unit 3 is connected to the one axial end of the change shaft S4. Thus, for example, the interior of the unit case 11 need not be accessed in order to connect the operation unit 3 to the power unit 2 in a manner permitting power transmission to the power unit 2. This improves the efficiency of the work of mounting the operation unit 3 on the power unit 2. It is also possible, for example, to mount the operation unit 3 as an additional part on an existing power unit 2.

The power transmission structure 31 transmits the power of the electric motor 30 to the change shaft S4 in the form of rotational power. That is, the power transmission structure 31 does not include any conversion mechanism located on the power transmission route between the electric motor 30 and the change shaft S4 to convert the power of the electric motor 30 to any form of power other than rotational power, such as linear motion power. The power transmission structure 31 is a speed reduction structure that reduces the speed of rotation produced by the power of the electric motor 30 and transmits the resulting rotational power to the change shaft S4. The drive shaft S5 of the electric motor 30 extends parallel to the change shaft S4. The front end of the electric motor 30 is located ahead of the rearmost of the points at which the operation unit 3 is fastened to the unit case 11.

For example, the operation unit 3 includes a housing 33 enclosing the power transmission structure 31. The housing 33 has a smaller maximum dimension in the axial direction of the drive shaft S5 than in a direction perpendicular to the axial direction. The maximum dimension of the housing 33 in the direction perpendicular to the axial direction is larger than the maximum outer diameter of the electric motor 30. The housing 33 is located outside the unit case 11 in the axial direction.

The vehicle body frame 7 includes a pair of left and right side frame portions 7a and at least one cross frame portion (two cross frame portions 7b and 7c in this embodiment). The side frame portions 7a are located behind the power unit 2 and extend in the up-down direction. The side frame portions 7a extend downward from the main frame portions 7d. The cross frame portions 7b and 7c are located behind the power unit 2 and extend in the vehicle width direction to connect the pair of side frame portions 7a together in the vehicle width direction.

The operation unit 3 is located inside the side frame portions 7a in the vehicle width direction. The cross frame portion 7b is located above the operation unit 3. The lower end of the cross frame portion 7c is located below the lower end of the operation unit 3. The point at which the operation unit 3 and the change shaft S4 are connected is located between the cross frame portions 7b and 7c in the up-down direction. The operation unit 3 overlaps the cross frame portions 7b and 7c when viewed in the up-down direction. Thus, the operation unit 3 is disposed in the vehicle inner space in a space-efficient manner while the interference between the operation unit 3 and the cross frame portions 7b and 7c is prevented. Additionally, the cross frame portion 7c prevents any obstacle from colliding with the operation unit 3 from below. The point at which the housing 33 is mounted on the unit case 11 is located ahead of the cross frame portions 7b and 7c.

The vehicle 1 further includes a shock absorber 21 and a power transmitter 22. The shock absorber 21 extends in the up-down direction and absorbs the shock applied to the drive wheel 8 from the ground surface. The shock absorber 21 includes: a main body 40 extending in the longitudinal direction of the shock absorber 21; a spring surrounding the outer circumference of the main body 40 and extensible and contractible in the longitudinal direction of the shock absorber 21; and a rod 41 projectable from and retractable into one longitudinal end of the main body 40. The upper end of the shock absorber 21, i.e., the upper end of the rod 41, is connected to the vehicle body at a point above the operation unit 3. The lower end of the shock absorber 21, i.e., the lower end of the main body 40, is connected to a component of the vehicle body at a point behind the operation unit 3, the component pivotally supporting the drive wheel 8. In this embodiment, the component is a swing arm 23.

The power transmitter 22 extends from the power unit 2 toward the radial center of the drive wheel 8 and transmits the output power of the transmission 10 to the drive wheel 8. The operation unit 3 is located inside the power transmitter 22 in the vehicle width direction. Examples of the power transmitter 22 include a chain, a belt, and a shaft. The power transmitter 22 of this embodiment is a chain. On the output shaft S3 is mounted a sprocket gear 24 meshing with the chain. On the drive wheel 8 is mounted a driven gear meshing with the chain.

The vehicle 1 includes the swing arm 23. The swing arm 23 is located behind the power unit 2. The swing arm 23 is pivotally supported at its front end by the vehicle body frame 7, and supports the drive wheel 8 at its rear end. In the vehicle 1, at least a part of the operation unit 3 is located below the pivotal center P of the swing arm 23. The operation unit 3 is located inside both ends of the power unit 2 in the vehicle width direction. In this embodiment, the operation unit 3 is located inside both ends of the unit case 11 in the vehicle width direction.

The vehicle 1 of this embodiment further includes a controller that controls the drive sources and the clutch 18. The controller controls the drive sources according to predetermined gear shifting commands. Specifically, the gear shifting commands include those related to the engine E, and the commands related to the engine E include those for air-fuel ratio control and for ignition timing control. The gear shifting commands include those related to the motor for travel M, and the commands related to the motor for travel M include those for torque control. The gear shifting commands include those related to the clutch 18, and the commands related to the clutch 18 include those for cut-off control for cutting off the power transmission between the drive source and the drive wheel 8 before a gear shifting process is effected by the operation unit 3. The drive source is operated according to the gear shifting command given from the controller depending on the situation. The transmission 10 of this embodiment may change the speed of rotation produced by externally input power according to the gear shifting command or according to an operator's command (gear shifting operation).

Figure 4:
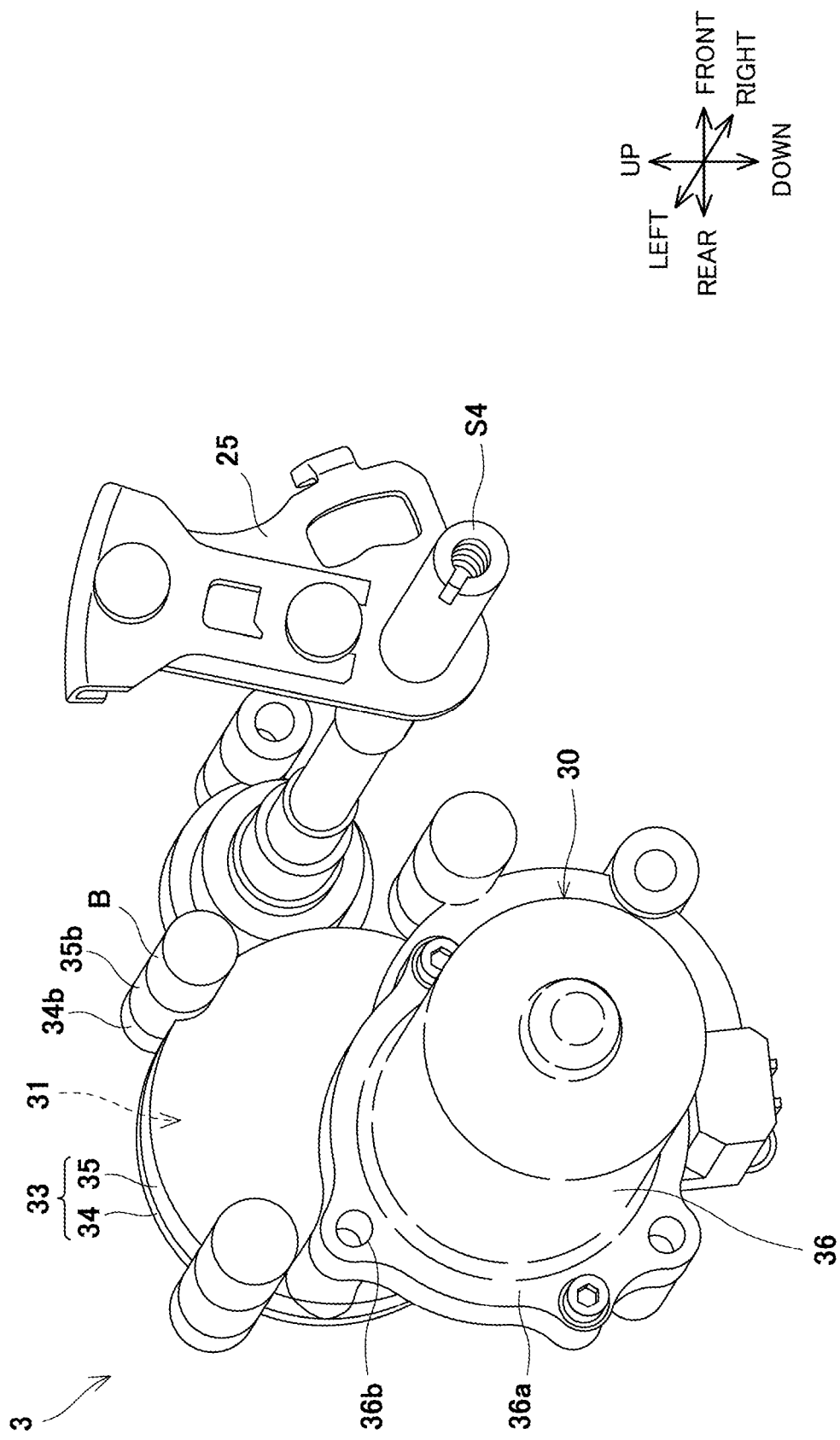
FIG. 4 is an external view of the operation unit of FIG. 1 as viewed from inside in the vehicle width direction.

FIG. 3 illustrates the internal structure of the operation unit 3 of FIG. 1 as viewed from outside in the vehicle width direction. In FIG. 3, the housing 33 is omitted, and the teeth of gears G1 to G6 are schematically depicted. FIG. 4 is an external view of the operation unit 3 of FIG. 1 as viewed from inside in the vehicle width direction. In FIG. 4, a positioning arm 25 of the power unit 2 is depicted. The positioning arm 25 is secured to the change shaft S4 and angularly movable together with the change shaft S4 to place the shift drum 17 into different angular positions in increments of a predetermined angle.

Referring to FIGS. 2 and 3, the electric motor 30 further includes a motor case 36 accommodating a rotor. The motor case 36 extends in the axial direction of the drive shaft S5. The drive shaft S5 projects outward from one longitudinal end of the motor case 36. The motor case 36 includes a bracket 36a located closer to the outer axial end of the drive shaft S5 than to the inner axial end of the drive shaft S5. The bracket 36a extends in the circumferential direction of the motor case 36 and extends outward in the radial direction of the drive shaft S5. The bracket 36a surrounds the circumference of the drive shaft S5. The bracket 36a includes holes 36b into which fasteners are inserted. The bracket 36a has a flat surface perpendicular to the axial direction of the drive shaft S5. The flat surface faces outward in the axial direction of the drive shaft S5 and is in surface contact with the housing 33.

The motor case 36 includes a connector 36c opposite the portion of the bracket 36a that faces the change shaft S4. To the connector 36c is connected a harness 37 (see FIG. 1) through which external electric power and signals are delivered to the electric motor 30. The connector 36c is spaced from the power transmission structure 31 in the radial direction of the drive shaft S5. The connector 36c extends in the axial direction of the drive shaft S5. Thus, a portion of the harness 37 connected to the connector 36c extends in the axial direction of the drive shaft S5. As such, the interference between the harness 37 and other components can be more reliably prevented than in the case where the harness 37 extends in the up-down or front-rear direction directly from the connector 36c.

The operation unit 3 of this embodiment is opposite the clutch 18 in the axial direction of the input shaft S2. Thus, the interference between the clutch case enclosing the clutch 18 and the operation unit 3 can be prevented, and the compactness of the operation unit 3 can be improved.

The power transmission structure 31 includes a gear train 32. The gear train 32 includes gears G1 to G6. Among the gears G1 to G6, the gear G1, which is the most upstream gear on the power transmission route in the power transmission structure 31, meshes with the drive shaft S5 of the electric motor 30, and the gear G6, which is the most downstream gear, meshes with the change shaft S4. Each of the gears G1 to G6 rotates about a rotational axis parallel to the axis of the drive shaft S5. The gear G1 is mounted on the drive shaft S5 and meshes with the gear G2. The gear G2 is integral with the gear G3 smaller in diameter than the gear G2. The gear G3 meshes with the gear G4 larger in diameter than the gear G3. The gear G4 is integral with the gear G5 smaller in diameter than the gear G4. The gear G5 meshes with the gear G6. The gear G6 is, for example, a sector (fan-shaped) gear and mounted on the change shaft S4. The gear G6 may be a gear of another shape such as a circular gear. The number of the gears of the gear train 32 is not limited to six.

The gears G2 and G4 partially overlap each other when viewed in the thickness direction of the gears G2 and G4. The gears G4 and G6 partially overlap each other when viewed in the thickness direction of the gears. All of the gears of the gear train 32 overlap the unit case 11 when viewed in the thickness direction of the gears. In other words, at least a part of the power transmission route in the power transmission structure 31 overlaps the unit case 11 when viewed in the vehicle width direction. Thus, in the vehicle 1, the power transmission structure 31 can be made compact, and the flexibility in choosing the position of the operation unit 3 relative to the change shaft S4 can be increased.

The power transmission structure 31 reduces the speed of rotation produced by rotational power of the drive shaft S5 through the series of gears G1 to G6 and transmits the resulting rotational power to the change shaft S4. Thus, the torque can be increased as the rotational power of the electric motor 30 is transmitted to the change shaft S4. As such, the electric motor 30 need not be a high-output motor, and a low-output motor may be used as the electric motor 30. Additionally, the power of the drive source is transmitted to the change shaft S4 in the form of rotational power. There is no need for any shift rod that converts the power of the electric motor 30 into linear motion power.

Referring to FIG. 4, the housing 33 includes first and second components 34 and 35. The components 34 and 35 are combined together in the axial direction of the drive shaft S5 to enclose the power transmission structure 31. The components 34 and 35 extend in the radial direction of the drive shaft S5. The components 34 and 35 respectively cover the opposite sides of the power transmission structure 31 in the axial direction of the drive shaft S5. The components 34 and 35 respectively include brackets 34a and 35a located along the respective circumferences of the components 34 and 35, and each of the brackets 34a and 35a includes holes 34b or 35b. The components 34 and 35 are fastened together by placing the brackets 34a and 35a in face-to-face contact and inserting fasteners B into the holes 34b of the bracket 34a and some of the holes 35b of the bracket 35a. The housing 33 and electric motor 30 are fastened together by placing the brackets 35a and 36a in face-to-face contact and inserting fasteners B into the other of the holes 35b of the bracket 35a and the holes 36b of the bracket 36a.

In this embodiment, the electric motor 30 is supported by the housing 33, and the housing 33 is supported by the unit case 11. Thus, the electric motor 30, in particular the portion of the motor case 36 that is around the outer axial end of the drive shaft S5, is supported by the unit case 11 via the housing 33 in a cantilever manner. As such, the vibration transmitted from the power unit 2 to the electric motor 30 can be reduced. This offers an improvement in the operational stability of the operation unit 3. Additionally, since the power transmission structure 31 is enclosed by the housing 33, the power transmission structure 31 is minimally affected by shock or obstacles such as foreign matter coming from outside. Specifically, in the case where the power transmission structure 31 includes the gear train 32 as in this embodiment, foreign matter coming from outside is prevented from adhering to the teeth of the gear G1 to G6. This leads to an improvement in the operational stability of the operation unit 3.

Figure 5:
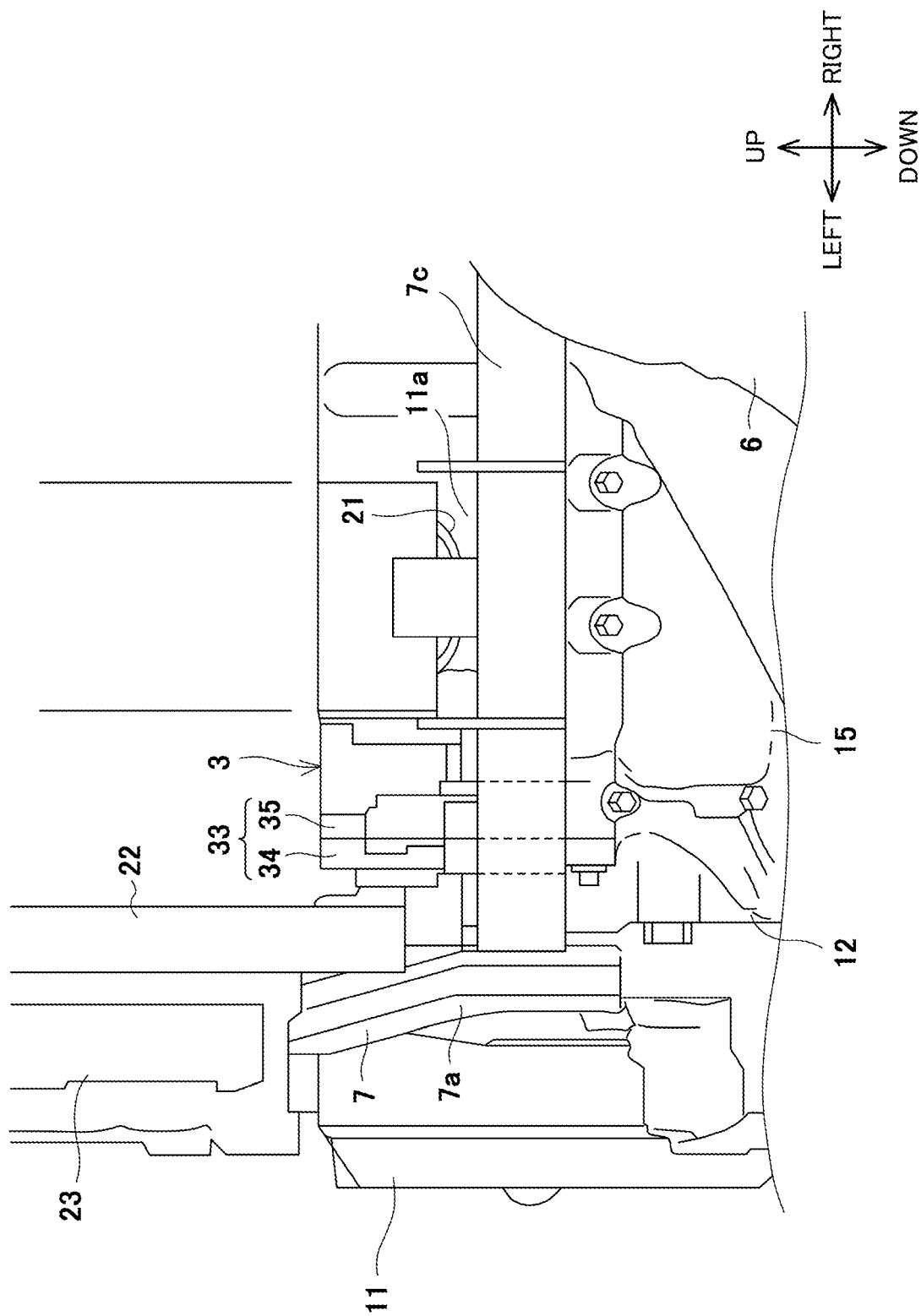
FIG. 5 is an external view of the operation unit of FIG. 1 as viewed from behind.

FIG. 5 is an external view of the operation unit 3 of FIG. 1 as viewed from behind. As shown in FIG. 5, the operation unit 3 is located inside both end surfaces of the unit case 11 in the vehicle width direction. The operation unit 3 as viewed from behind is located ahead of the cross frame portion 7c. The oil pan 15 is fastened to the crankcase 12 by fasteners from below. The points at which the oil pan 15 is fastened to the crankcase 12 are located below the operation unit 3. Thus, the operation unit 3 does not interfere with the points of fastening.

In the vehicle 1, as described above, the operation unit 3 is mounted on the exterior of the unit case 11 of the power unit 2. This eliminates the need to dispose the operation unit 3 within the power unit 2, making it easy to equip the vehicle 1 with the operation unit 3. Thus, the space required for the vehicle 1 to include the operation unit 3 can be reduced.

In the vehicle 1, the power of the electric motor 30 is transmitted to the change shaft S4 in the form of rotational power. There is no need for any shift rod that converts the power of the electric motor 30 into linear motion power. Thus, the entire system including the power unit 2 and the operation unit 3 can be smaller in size than in the case where a shift rod is required. Further, the burden of making a vehicle design for allowing the vehicle 1 to have a sufficient space for inclusion of the operation unit 3 can be lessened. This leads to a reduction in the manufacturing cost of the vehicle 1.

In the operation unit 3 of this embodiment, the electric motor 30 is supported by the housing 33, and the housing 33 is supported by the unit case 11. This eliminates the need for any dedicated component for supporting the operation unit 3, thus simplifying the structure for allowing the operation unit 3 to be supported by the power unit 2.

The drive shaft S5 of the electric motor 30 extends parallel to the change shaft S4, and the housing 33, as viewed in the axial direction of the drive shaft S5, has a larger maximum outer diameter than the electric motor 30 and is located outside the unit case 11 in the axial direction of the drive shaft S5. Thus, the power transmission structure 31 and the unit case 11 can be arranged to overlap each other when viewed in the axial direction of the drive shaft S5. As such, the interference between the power transmission structure 31 and the unit case 11 can be prevented, and the electric motor 30 can be easily located close to the unit case 11.

The transmission 10 includes the input shaft S2 located ahead of the change shaft S4, and the operation unit 3 is located behind the change shaft S4. Thus, the operation unit 3 can be easily located behind the power unit 2. As such, the space behind the power unit 2 can be effectively used.

In the vehicle 1, at least a part of the operation unit 3 is located below the pivotal center P of the swing arm 23. The space below the swing arm 23 can be effectively used since at least a part of the operation unit 3 is located below the pivotal center P of the swing arm 23. Thus, the operation unit 3 can be disposed in a more space-efficient manner. Additionally, the operation unit 3 can be prevented from being hit by an obstacle coming from above the pivotal center P.

The vehicle 1 includes the shock absorber 21, and the upper end of the shock absorber 21 is connected to the vehicle body, while the lower end of the shock absorber 21 is connected to a component of the vehicle body that pivotally supports the drive wheel 8. The operation unit 3 is located below the upper end of the shock absorber 21 and ahead of the lower end of the shock absorber 21. Thus, the interference between the operation unit 3 and the shock absorber 21 can be prevented, and at the same time the space below the upper end of the shock absorber 21 can be effectively used.

The vehicle 1 includes the vehicle body frame 7, and the vehicle body frame 7 includes the side frame portions 7a located behind the power unit 2 and extending in the up-down direction. The operation unit 3 is located inside the side frame portions 7a in the vehicle width direction. Thus, the operation unit 3 can be disposed in a space-efficient manner, and at the same time can be protected laterally by the side frame portions 7a to prevent obstacles from colliding with the lateral regions of the operation unit 3. The interference between the operation unit 3 and the side frame portions 7a can also be prevented.

In the vehicle 1, the operation unit 3 is located inside the power transmitter 22 in the vehicle width direction. Thus, the operation unit 3 can be disposed in a space-efficient manner, and at the same time the interference between the operation unit 3 and the power transmitter 22 can be prevented.

In the vehicle 1, the front end of the electric motor 30 is located ahead of the rear end surface of the unit case 11. Thus, the length over which the electric motor 30 projects rearward can be reduced, and the interference between the electric motor 30 and other components such as the swing arm 23 can be easily prevented.

In the vehicle 1, the drive sources include the motor for travel M, and the motor for travel M is located above the unit case 11. Thus, the interference between the electric motor 30 and the motor for travel M can be prevented, and the operation unit 3 can be located close to the center of gravity of the power unit 2.

In the vehicle 1, the operation unit 3 is located inside both ends of the power unit 2 in the vehicle width direction. Thus, the operation unit 3 is prevented from projecting outward beyond the ends of the power unit 2 in the vehicle width direction, and can be disposed in a compact manner. Additionally, contact of the operation unit 3 with external objects can be prevented to ensure the operational stability of the operation unit 3.

In the vehicle 1, the clutch 18 of the transmission 10 is mounted on the first axial half of the input shaft S2, and the operation unit 3 is mounted on the region of the unit case 11 that is on the same side as the second axial half of the input shaft S2. Thus, the interference between the operation unit 3 and the clutch 18 can be prevented, and the operation unit 3 can be easily mounted on the exterior of the power unit 2.

In the vehicle 1, the motor for travel M and the operation unit 3, as viewed in the axial direction of the input shaft S2, are opposite each other across a straight line passing through the axial centers of the input and output shafts S2 and S3. Thus, the interference between the motor for travel M and the operation unit 3 can be prevented, and the power unit 2 can be made compact. In the vehicle 1, the operation unit 3 is opposite the exhaust pipe 6 in the vehicle width direction. Thus, the exhaust gas heat-induced increase in the temperature of the operation unit 3 can be reduced.

The present disclosure is not limited to the embodiment described above, and changes, additions, or deletions can be made to the configuration described above. The vehicle 1 is not limited to motorcycles and may be another type of vehicle such as a motor tricycle. The vehicle 1 need not be a straddle vehicle. The vehicle 1 is not limited to hybrid vehicles. The power unit 2 may include different types of drive sources or include drive sources of the same type. For example, the power unit 2 may include only an internal combustion engine or only an electric motor as the drive source.

The gear train 32 is not limited to a configuration consisting of spur and sector gears, and may include another type of gear such as a helical gear. The motor case 36 of the electric motor 30 may be mounted directly on the unit case 11. The transmission 10 may be in a form where a dog clutch slidable by the shift fork 16 has gear teeth or may be in a form where the dog clutch has no gear teeth. The controller may increase or decrease the output power of the drive source based on a gear shifting command to facilitate the axial movement of the dog clutch. The transmission 10 may be a dual clutch transmission (DCT).

The vehicle 1 may include a foot-operated lever operable by the user, in particular the operator, to give a gear shifting command. For example, the foot-operated lever may be located in the vicinity of the change shaft S4 as in conventional vehicles. In this case, the power transmission route between the foot-operated lever and the change shaft S4 can be made compact. In the embodiment described above, the foot-operated lever may be located opposite the clutch case enclosing the clutch 18 in the axial direction of the input shaft S2, and this can prevent the interference between the foot-operated lever and the clutch case.

What is claimed is:
1. A vehicle comprising:
a drive source for travel that includes an internal combustion engine including a crankshaft extending in a vehicle width direction of the vehicle;
a power unit including a transmission that changes the speed of rotation produced by output power of the drive source and a case accommodating the transmission, the transmission including a pivotally supported change shaft, the change shaft being angularly movable about an axis to change a gear ratio of the transmission; and
an operation unit that operates to angularly move the change shaft, the operation unit including:
an electric motor including a drive shaft extending in the vehicle width direction; and
a power transmission structure that transmits power of the electric motor to the change shaft in the form of rotational power by which the change shaft is angularly moved, wherein
the electric motor includes a motor case located side by side with the power transmission structure in the vehicle width direction,
a lower end of the operation unit is located above a lower end of the case of the power unit, and
the operation unit is located behind the change shaft and mounted on an exterior of the case of the power unit.

2. The vehicle according to claim 1, wherein
the operation unit includes a housing enclosing the power transmission structure,
the electric motor is supported by the housing, and
the housing is supported by the case of the power unit.

3. The vehicle according to claim 1, wherein
the operation unit includes a housing enclosing the power transmission structure,
the drive shaft of the electric motor extends parallel to the change shaft, and
the housing as viewed in an axial direction of the drive shaft has a larger maximum outer diameter than the electric motor and is located outside the electric motor in the axial direction.

4. The vehicle according to claim 1, wherein
the transmission includes an input shaft located ahead of the change shaft.

5. A vehicle comprising:
a drive source for travel that includes an internal combustion engine including a crankshaft extending in a vehicle width direction of the vehicle;
a power unit including a transmission that changes the speed of rotation produced by output power of the drive source and a case accommodating the transmission, the transmission including a pivotally supported change shaft, the change shaft being angularly movable about an axis to change a gear ratio of the transmission;
an operation unit that operates to angularly move the change shaft, the operation unit including:
an electric motor including a drive shaft extending in the vehicle width direction, and
a power transmission structure that transmits power of the electric motor to the change shaft in the form of rotational power by which the change shaft is angularly moved; and
a swing arm located behind the power unit, the swing arm being pivotally supported at a front end thereof by a vehicle body frame and supporting at a rear end thereof a drive wheel, wherein
the electric motor includes a motor case located side by side with the power transmission structure in the vehicle width direction,
a lower end of the operation unit is located above a lower end of the case of the power unit,
the operation unit is mounted on an exterior of the case of the power unit, and
at least a part of the operation unit is located below a pivotal center of the swing arm.

6. The vehicle according to claim 1, further comprising:
a shock absorber extending in an up-down direction to absorb shock applied to a drive wheel of the vehicle from a ground surface, wherein
an upper end of the shock absorber is connected to a vehicle body of the vehicle,
a lower end of the shock absorber is connected to a component of the vehicle body, the component pivotally supporting the drive wheel, and
the operation unit is located below the upper end of the shock absorber and ahead of the lower end of the shock absorber.

7. The vehicle according to claim 1, further comprising a vehicle body frame, wherein
the vehicle body frame includes a side frame portion located behind the power unit and extending in an up-down direction, and
the operation unit is located inside the side frame portion in the vehicle width direction.

8. The vehicle according to claim 1, further comprising a power transmitter extending from the power unit toward a drive wheel of the vehicle to transmit output power of the transmission to the drive wheel, wherein
the operation unit is located inside the power transmitter in the vehicle width direction.

9. The vehicle according to claim 1, wherein a front end of the electric motor is located ahead of a rear end surface of the case of the power unit.

10. The vehicle according to claim 1, wherein
the drive source includes a motor for travel, and
the motor for travel is located above the case of the power unit.

11. The vehicle according to claim 1, wherein the operation unit is located inside both ends of the power unit in the vehicle width direction.

12. The vehicle according to claim 1, further comprising a shock absorber connected to a component pivotally supporting a drive wheel of the vehicle, wherein
upper and lower ends of the shock absorber are connected to a vehicle body of the vehicle,
an upper end of the operation unit is located below the upper end of the shock absorber, and
a lower end of the operation unit is located above the lower end of the shock absorber.

13. A vehicle comprising:
a power unit including a transmission that changes the speed of rotation produced by output power of a drive source for travel and a case accommodating the transmission, the transmission including a pivotally supported change shaft, the change shaft being angularly movable about an axis to change a gear ratio of the transmission; and
an operation unit that operates to angularly move the change shaft, the operation unit including an electric motor and a power transmission structure that transmits power of the electric motor to the change shaft in the form of rotational power by which the change shaft is angularly moved, wherein
the drive source includes a motor for travel, the motor for travel being located above the case of the power unit, and
the operation unit is located behind the change shaft and mounted on an exterior of the case of the power unit.

14. The vehicle according to claim 1, wherein
the drive source for travel includes an oil pan, and
a point at which the operation unit is fastened to the case of the power unit is located above the oil pan.

* * * * *